(12) United States Patent
Shinya et al.

(10) Patent No.: US 10,919,489 B2
(45) Date of Patent: Feb. 16, 2021

(54) SEATBELT RETRACTOR

(71) Applicant: AUTOLIV DEVELOPMENT AB, Vargarda (SE)

(72) Inventors: Yusuke Shinya, Yokohama (JP); Ganta Hibata, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 71 days.

(21) Appl. No.: 16/405,081

(22) Filed: May 7, 2019

(65) Prior Publication Data
US 2019/0344749 A1 Nov. 14, 2019

(30) Foreign Application Priority Data
May 9, 2018 (JP) .................................. 2018-090677

(51) Int. Cl.
*B60R 22/48* (2006.01)
*B60R 22/40* (2006.01)

(52) U.S. Cl.
CPC .............. *B60R 22/48* (2013.01); *B60R 22/40* (2013.01); *B60R 2022/4808* (2013.01)

(58) Field of Classification Search
CPC .. B60R 22/40; B60R 22/48; B60R 2022/4808
See application file for complete search history.

(56) References Cited

U.S. PATENT DOCUMENTS

| 7,537,179 B2 | 5/2009 | Schmidt et al. | |
| 2008/0135665 A1* | 6/2008 | Schmidt | B60R 22/40 |
| | | | 242/384.4 |
| 2014/0042257 A1* | 2/2014 | Clute | B60R 22/40 |
| | | | 242/384.2 |

FOREIGN PATENT DOCUMENTS

| JP | H 09193742 A | 7/1997 |
| JP | 2008-543666 A | 12/2008 |

* cited by examiner

*Primary Examiner* — Sang K Kim
(74) *Attorney, Agent, or Firm* — Dickinson Wright PLLC (57) ABSTRACT

A seatbelt retractor configured to ease the tightness of a seatbelt felt by an occupant when the occupant wearing the seatbelt reclines a seatback. An acceleration sensor 70 includes a sensor cover 71 which tilts with a seatback, a sensor housing 72 supported swingably with respect to the sensor cover 71 and having an inertial body support surface 78 and an inertial body 73 which is displaced when the acceleration reaches at least a prescribed value. The sensor housing 72 includes an external teeth part 84 having a plurality of external teeth 81 and 82 and a gap part 83 without external teeth. A lever member 90 is coupled to the shaft 22 of the spindle 20 by a friction coupling, and the lever member turns in a first direction in which an engagement part 92 is engaged with the external teeth part 84 when the spindle 20 rotates in a seatbelt drawing-out direction and turns in a second direction in which the engagement part 92 moves apart from the external teeth part 84 when the spindle 20 rotates in a seatbelt winding-up direction.

9 Claims, 5 Drawing Sheets

SEATBELT RETRACTOR

CROSS-REFERENCE TO RELATED APPLICATIONS

This application claims the benefit of priority under 35 U.S.C. § 119 to Japanese Patent Application No. 2018-090677, filed May 9, 2018, the contents of which are incorporated herein by reference in their entirety.

FIELD OF THE INVENTION

The present invention relates to seatbelt retractors, and more specifically to a seatbelt retractor mounted at the seatback of a reclining type seat.

BACKGROUND

A seatbelt device provided in a vehicle is adapted to restrain a seated occupant by a seatbelt drawn out from a seatbelt retractor in a seatback or otherwise mounted to the vehicle structure and to protect the occupant for example in an event of a vehicle collision. In the seatbelt retractor, an acceleration sensor detects horizontal acceleration greater than a prescribed value acting on the vehicle for example in an event of a vehicle collision to actuate a locking mechanism for the seatbelt retractor, so that the seat belt is prevented from being further drawn out. A known inertial body used for the acceleration sensor includes a ball or a self-contained inertial body.

When a seatbelt retractor having an acceleration sensor of this kind is provided mounted to the seatback of a reclining type seat, the mounting position of the seatbelt retractor changes depending on the reclining angle of the seatback, and acceleration cannot be detected appropriately in the state. There has been a known seatbelt retractor including an acceleration sensor capable of detecting acceleration appropriately regardless of the reclining angle of the seatback. In some cases, the acceleration sensor may turn with respect to the seatbelt device and have its acceleration detection sensitivity changed for example in response to strong braking force acting upon the vehicle.

In a seatbelt retractor disclosed in Japanese Application No. 2008-543666 (A) (See U.S. Pat. No. 7,537,179 (B2)), a control lever coupled to a belt shaft in a friction coupling manner is engaged with an acceleration sensor, so that the position of the acceleration sensor with respect to the seatbelt device is fixed and the acceleration detection sensitivity is kept constant when the seatbelt is drawn out for example in an event of a vehicle collision. When the seatbelt is wound up, the control lever and the acceleration sensor can be disengaged from each other.

In a seatbelt retractor disclosed in Japanese Patent Application Publication No. H09-193742 (A), a main body part having a reel shaft for winding up a seatbelt is attached to the seatback, a discrete body part having a deceleration sensor using an inertial body is attached to the seat part, and the reel shaft of the main body part and a lock gear provided at the discrete body are connected by a flexible shaft assembly. When the inertial body operates, the lock gear pivots to lock the reel shaft of the main body part through a wire assembly.

However, in the seatbelt retractor disclosed in Japanese Application No. 2008-543666 (A), the seatbelt is drawn out as the occupant wearing the seatbelt reclines, so that the position of the acceleration sensor is fixed. In this way, the locking mechanism is actuated to lock the seatbelt, the seatbelt presses the occupant, which may be a cause for discomfort, and there is still a room for improvement in this respect. The above-described disadvantage is not an issue in the seatbelt retractor disclosed in Japanese Patent Application Publication No. H09-193742 but the disclosed retractor has a complicated structure in which the main body part attached to the seatback and the discrete body part are connected by the flexible shaft assembly, which may be a factor responsible for increase in the cost.

With the foregoing in view, it is an object of embodiments of the present invention to provide a seatbelt retractor which can ease the tightness of a seatbelt felt by an occupant when the occupant wearing the seatbelt reclines.

The object of the present invention is achieved by the embodiments described herein.

SUMMARY AND INTRODUCTORY DESCRIPTION

Embodiments of the present invention include a seatbelt retractor mounted at a seatback of a reclining type seat provided in a vehicle having a spindle which winds up a seatbelt, an acceleration sensor which detects acceleration in a vehicle front-back direction, and a locking mechanism which locks drawing-out operation of the seatbelt in response to acceleration detected by the acceleration sensor. The acceleration sensor includes a sensor cover which tilts together with the seatback, a sensor housing having an inertial body-support surface and supported swingably with respect to the sensor cover around an axial line in a vehicle-width direction to swing in the vehicle front-back direction with respect to the sensor cover when the seatback is tilted. An inertial body is supported on the inertial body-support surface and displaced from a neutral position when the acceleration reaches at least a prescribed value, and an actuating member which operates synchronously with movement of the inertial body in the vehicle front-back direction and actuates the locking mechanism to a locking side. The sensor housing includes an external teeth part having a plurality of teeth arranged in a circular-arc shape. The retractor further includes a lever member coupled to the shaft of the spindle by friction coupling, wherein the lever member turns in a first direction in which an engagement part provided at a tip end thereof is engaged with the external teeth part when the spindle rotates in a seatbelt drawing-out direction and turns in a second direction in which the engagement part moves apart from the external teeth part when the spindle rotates in a seatbelt winding-up direction, and a gap part not having the teeth is formed at a part of the external teeth part.

In an embodiment of the present invention the seatbelt retractor described above further includes the feature that the external teeth part is formed at an outer peripheral part formed as a part extending from a part of a side wall of the sensor housing.

In an embodiment of the present invention the seatbelt retractor described above further includes the feature wherein the external teeth part is formed by extending a side wall of the sensor housing in the vehicle-width direction into a flange shape.

In an embodiment of the present invention the seatbelt retractor described above further includes the feature wherein the external teeth part is formed at an outer peripheral part of a plate shaped member fixed on a side wall of the sensor housing.

In an embodiment of the present invention the seatbelt retractor described above further includes the feature wherein the gap part of the external teeth part is formed in a position corresponding to a prescribed reclining angle for the seatback.

In an embodiment of the present invention the seatbelt described above further includes the feature wherein the prescribed reclining angle is an angle at which drawing-out locking by drawing out of the seatbelt occurs during reclining of the seatback.

Using the seatbelt retractor according to the present invention, the sensor housing for the acceleration sensor which has an inertial body support surface and swings in the vehicle front-back direction when the seatback is tilted includes an external teeth part having a plurality of teeth arranged in a circular-arc shape. The engagement part of the lever member is coupled to the shaft of the spindle by friction coupling turns to be engaged with the external teeth part when the spindle rotates in the seatbelt drawing-out direction. Furthermore, a gap part without the teeth is formed at a part of the external teeth part. In this way, the locking starting timing for the seatbelt may be delayed and the amount of the drawn-out seatbelt is increased during reclining, and the tightness of the seatbelt felt by the occupant can be eased when the occupant wearing the seatbelt reclines.

DETAILED DESCRIPTION

A seatbelt retractor according to one embodiment of the present invention will be described in detail in conjunction with the accompanying drawings.

The seatbelt retractor 10 according to the embodiment is mounted at the seatback of a reclining type seat (not shown) and can be tilted (reclined) together with the seatback in the vehicle front-back direction.

Figure 1:
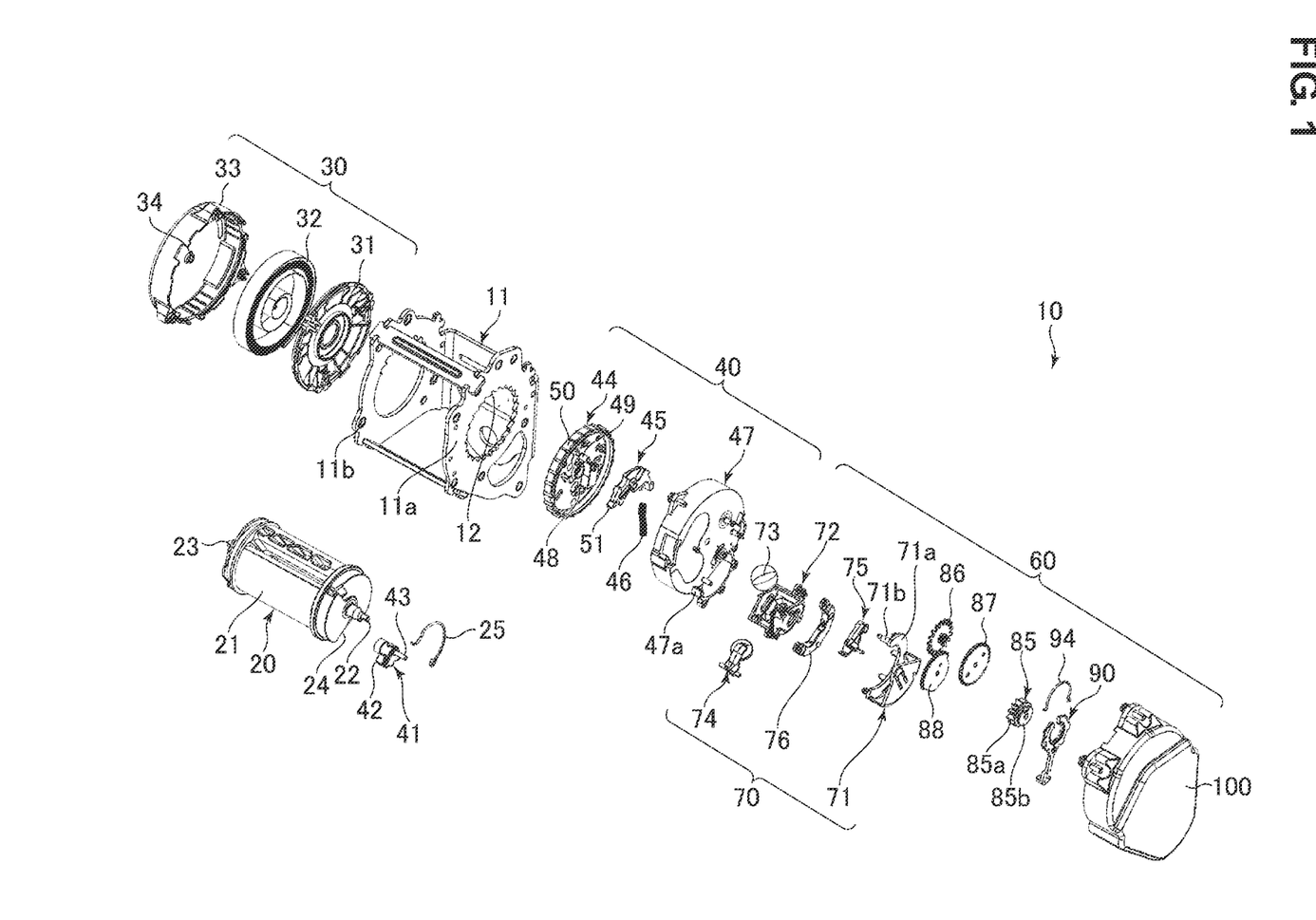
FIG. 1 is an exploded perspective view of a seatbelt retractor according to one embodiment of the present invention.

As shown in FIG. 1, the seatbelt retractor 10 includes a spindle 20 of a metal (such as an aluminum alloy) on which a seatbelt (not shown) is wound, a U-shaped frame 11 of a metal which supports the spindle 20 in a rotatable manner, a locking mechanism 40 provided on the outer side of a first side plate 11a of the frame 11 to mechanically lock drawing out of the seatbelt, a sensor mechanism 60 which includes an acceleration sensor 70, and a spring type winding-up device 30 provided on the outer side of a second side plate 11b of the frame 11 to energize the spindle 20 to rotate in the seatbelt winding-up direction.

The pair of side plates 11a and 11b of the frame 11 are opposed to each other with an axial center part of the spindle 20 therebetween. A series of internal teeth 12 can be engaged by the claw 42 of a lock dog 41 which will be described are formed at the inner circumference of the circular opening of the side plate 11a of the frame 11.

The spindle 20 includes a trunk part 21 on which the seatbelt is wound and a pair of shafts 22 and 23 which extend axially outwardly from the trunk part 21. The spindle 20 has the shaft 22 (one of the pair) fitted to a support hole formed at the boss (not shown) of a system cover 100 preferably formed of a polymeric resin which will be descried, and the shaft 23 (the other of the pair) is fitted to a support hole 34 formed by a resin spring case 33, so that these shafts are supported in a rotatable manner. The spindle 20 can rotate to wind up/draw out the seatbelt.

A substantially triangular lock dog storing space 24 is formed on one end side of the spindle 20 and a lock dog 41 is stored in the lock dog storing space 24 in a displaceable manner.

The winding-up device 30 includes a spring housing 31, a winding spring 32 made of a helically wound, strip-shaped spring member to constantly energize the spindle 20 in the winding-up direction, and the spring case 33 fixed on the second side plate 11b of the frame 11 to axially and radially cover the spring housing 31. The support hole 34 is formed at the inner wall surface of the spring case 33 to support the shaft 23 on the other end side of the spindle 20 in a rotatable manner.

The locking mechanism 40 includes a lock dog 41 of a metal (such as iron) as a locking member, a resin steering wheel 44, and a WS lever 45 and a WS spring 46 which prevent the rotation of the spindle 20 in the seatbelt drawing-out direction in response to abrupt drawing out of the seatbelt, and the locking mechanism is covered with a bearing plate 47 fixed to the frame 11.

The steering wheel 44 is supported to rotate relative to the spindle 20 and delayed in rotation with respect to the spindle 20 to actuate the lock dog 41. The steering wheel 44 has a cam hole 48 with which the cam pin 43 of the lock dog 41 is engaged, a protruding shaft 49 which supports the WS lever 45 in a swingable manner, and multiple engagement claws 50 formed at the outer peripheral surface.

The lock dog 41 is energized counterclockwise with respect to the spindle 20 by an omega spring 25. Therefore, the lock dog 41 having the cam pin 43 inserted in the cam hole 48 is held in an unlocking direction in which the claw 42 moves apart from the internal teeth 12. When the steering wheel 44 rotates clockwise relative to the spindle 20 (actually the spindle 20 rotates), the cam pin 43 operates along the cam hole 48 to let the claw 42 advance radially outwardly. The radially outwardly advanced claw 42 is engaged with the internal teeth 12 of the frame 11, so that the spindle 20 is locked by the internal teeth 12 of the frame 11 and the rotation in the seatbelt drawing-out direction is mechanically locked.

The WS (webbing sensor or webbing sensing) lever 45 is made of a metal to function also as an inertial body and includes a claw 51 engageable with internal teeth (not shown) formed at the inner surface of the bearing plate 47, and is fitted to the protruding shaft 49 of the steering wheel 44. The WS lever 45 is mounted with the WS spring 46 which energizes the claw 51 in an inwardly withdrawing direction (in the direction apart from the internal teeth of the bearing plate 47). Therefore, in a normal state, the claw 51 is held in an inactive position in which the claw is not engaged with the internal teeth of the bearing plate 47.

In this way, when the seatbelt is drawn out as the occupant abruptly moves, the WS lever 45 pivots by inertial force, so that the claw 51 of the WS lever 45 is made to protrude outwardly and engaged with the internal teeth of the bearing plate 47. This prevents the steering wheel 44 from rotating in the seatbelt drawing-out direction.

The acceleration sensor 70 as a part of the sensor mechanism 60 is provided below the bearing plate 47. Also with reference to FIGS. 2 and 3, the acceleration sensor 70 includes a sensor cover 71 fixed at the bearing plate 47, a sensor housing 72, a CS ball 73 as an inertial body stored in the sensor housing 72, first and second sensor levers 74 and 75 serving as actuating members, and a sensor weight 76 fixed at the sensor housing 72.

Figure 3:
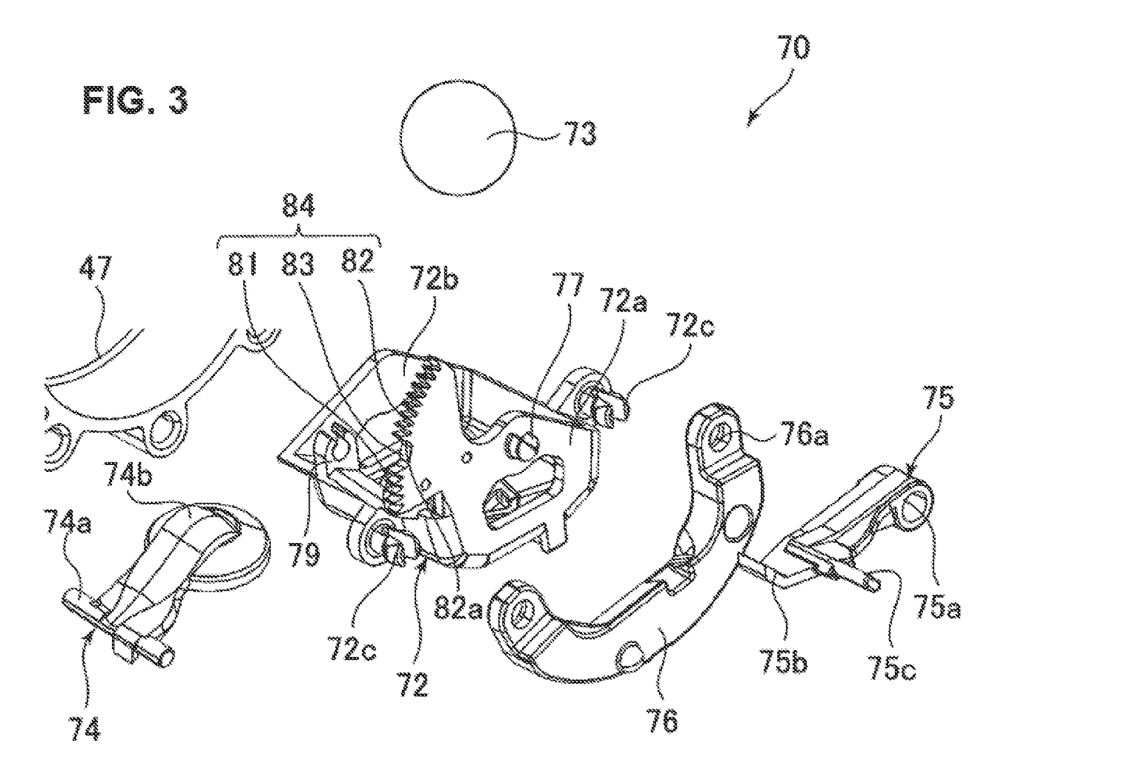
FIG. 3 is an essential part exploded perspective view of the acceleration sensor.
Figure 4A:
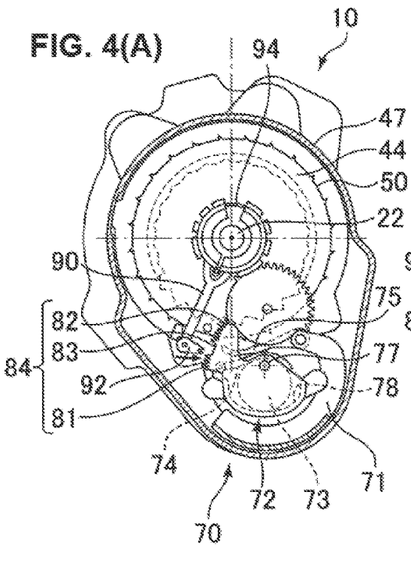
FIG. 4(A) is a side view of the seatbelt retractor when an occupant wears a seatbelt and the seatback of a reclining type seat is tilted 11° backward in a reference position.

The sensor housing 72 is in an open-top, substantial bowl shape having its side surfaces in the front-back and width directions surrounded by side walls and is provided with an inertial body support surface 78 as a conically recessed surface at the bottom (see FIG. 4(A)). The sensor housing 72 includes a pair of pins 77 (only one of which is shown in FIG. 3) which protrude parallel to the shaft 22 of the spindle 20 from side walls 72a and 72b in the vehicle-width direction and is pivotably supported by the sensor cover 71.

A pair of pins 72c provided at the sensor housing 72 are inserted through a pair of holes 76a of the sensor weight 76 to fix the sensor weight 76 to the sensor housing 72. In this way, the sensor housing 72 is allowed to pivot around the pair of pins 77 and kept in the vertical direction by the gravity acting upon the sensor weight 76.

The inertial body support surface 78 as a conically recessed surface which supports the CS ball 73 is provided at the bottom of the sensor housing 72. When the CS ball 73 placed on the inertial body support surface 78 is subjected to acceleration at least in a prescribed level in the horizontal direction, the CS ball 73 is displaced from the neutral position and detects acceleration acting on the vehicle or the seatbelt retractor 10.

A shaft 74a formed at the base end of the first sensor lever 74 is pivotably fitted to a pair of arm parts 79 (only one of which is shown in FIG. 3) which protrude upward from the sensor housing 72. A bowl part 74b which covers the upper surface of the CS ball 73 is provided on the tip end side of the first sensor lever 74.

The second sensor lever 75 includes a support hole 75a formed at the base end, an engagement claw 75b formed at the tip end, and an engagement piece 75c provided to protrude laterally (in the vehicle-width direction) from the middle part between these ends. The second sensor lever 75 is supported pivotably as the support hole 75a is inserted over the support pin 71b provided at the bowl part 71a which protrudes upward from the sensor cover 71 (see FIG. 1). The second sensor lever 75 abuts against the upper surface of the bowl part 74b of the first sensor lever 74.

When the CS ball 73 is displaced from the neutral position by acceleration, the first sensor lever 74 pivots around the shaft 74a to raise the second sensor lever 75 in abutment against the bowl part 74b, so that the engagement claw 75b is engaged with the engagement claw 50 of the steering wheel 44, and the rotation of the steering wheel 44 is stopped.

In this way, the lock dog 41 is actuated and engaged with the internal teeth 12 provided at the first side plate 11a on one side of the frame 11, so that the seatbelt is prevented from being drawn out and the occupant is protected. More specifically, the first and second sensor levers 74 and 75 form actuating members configured to actuate the locking mechanism 40 which includes the steering wheel 44, the lock dog 41, and the internal teeth 12 of the frame 11.

The side wall 72a on one side of the sensor housing 72 is provided to extend in a sector flange shape in the outward direction (in the upper left direction in FIG. 3) and has an external teeth part 84 at the circular-arc-shaped outer peripheral part around the pin 77. The external teeth part 84 includes a plurality of external teeth 81 and 82 formed at opposed ends in the peripheral direction and a gap part 83 formed between the external teeth 81 and 82.

The gap part 83 does not have external teeth 81 or 82 and is formed each in positions corresponding to the tilt angles of the seatback of the reclining type seat (not shown), for example in a position corresponding to a reference attachment angle for the seatbelt retractor 10 and an angle 6° tilted from the reference attachment angle.

Figure 2:
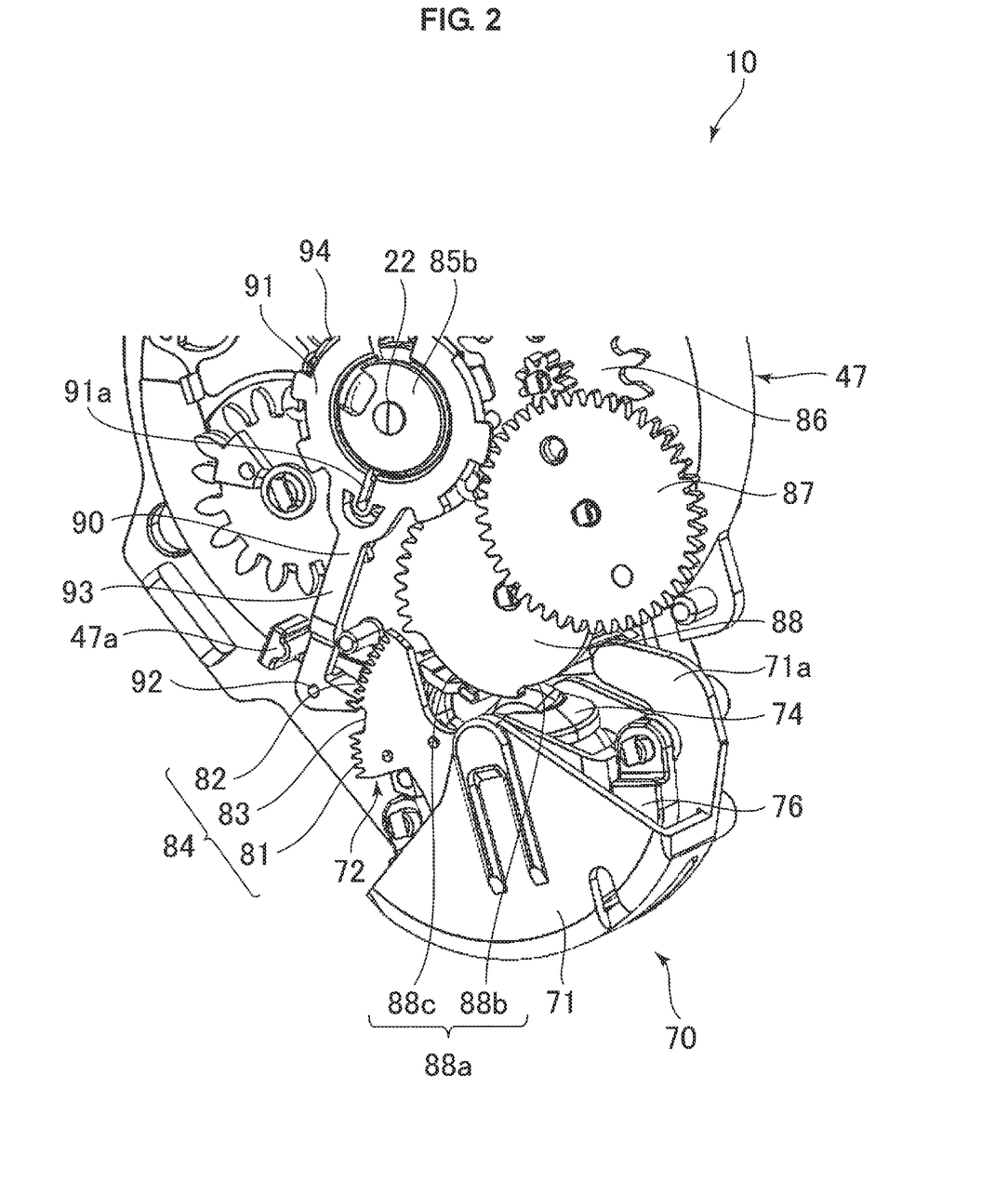
FIG. 2 is a perspective view illustrating a vicinity of an acceleration sensor shown in FIG. 1.

With reference to FIGS. 1 and 2, a center hub 85 is fixed at the shaft 22 of the spindle 20 which protrudes axially outwardly from the bearing plate 47 so that the hub can rotate together with the shaft. The center hub 85 includes a gear 85a and a cylindrical part 85b which are formed in an axially aligned manner. The gear 85a of the center hub 85 forms a gear train together with first and second gears 86 and 87 and a cam disk 88.

The cam disk 88 rotates as the rotation of the shaft 22 is decelerated according to the gear ratio of the gear train. A cam part 88a is formed opposed to the engagement piece 75c of the second sensor lever 75 at the outer peripheral surface of the cam disk 88. The cam part 88a includes, in a continuous shape, a cam surface 88b having a small radius from the rotation center of the cam disk 88 and a cam surface 88c having a large radius from the rotation center of the cam disk 88.

When the rotation of the cam disk 88 causes the cam surface 88b to be positioned opposed to the engagement piece 75c of the second sensor lever 75, there is a prescribed gap formed between the cam surface 88b and the engagement piece 75c of the second sensor lever 75. Therefore, the second sensor lever 75 can pivot around the support hole 75a and acceleration can be detected by the acceleration sensor 70.

When the rotation of the cam disk 88 causes the cam surface 88c to be positioned to oppose the engagement piece 75c of the second sensor lever 75, the cam surface 88c abuts against the engagement piece 75c of the second sensor lever 75 to prevent the second sensor lever 75 from pivoting.

The position for switching between the cam surfaces 88b and 88c, in other words, the position in which the cam surface 88c starts to abut against the engagement piece 75c of the second sensor lever 75 is set to be switched during the period in which the state in which no occupant is seated and the buckle is latched by the tongue (neither of which is shown) (an empty-latch state) is switched to the state in which the entire seatbelt is wound up by the spindle (a seatbelt stored state).

When this causes the cam surface 88c to be positioned opposed to the engagement piece 75c of the second sensor lever 75, the second sensor lever 75 is not actuated even in response to horizontal acceleration acting on the acceleration sensor 70, and the end lock of the acceleration sensor 70 by unintended actuation of the second sensor lever 75 can be prevented.

Also with reference to FIG. 2, the base part 91 of a lever member 90 is fitted slidably to the cylindrical part 85b of the center hub 85. An arm part 93 is provided to extend radially outwardly from the base part 91, and an engagement part 92 is formed integrally at the tip end of the arm part 93.

In a side view, the base part 91 is formed to have a substantially C shape having a notched part in the peripheral direction, and a radially extending notch groove 91*a* is provided on the opposite side to the notched part. In this way, the base part 91 can elastically deform in the radial direction (can have its radius reduced).

A friction spring 94 is mounted at an annular groove (not shown) formed at the outer peripheral surface of the base part 91. In this way, the base part 91 has its radius reduced by the elastic force of the friction spring 94, and the cylindrical part 85*b* of the center hub 85 and the base part 91 are coupled by friction force. The level of the friction force is substantially proportionate to the elastic force of the friction spring 94.

When the center hub 85 rotates together with the spindle 20, the lever member 90 rotates together by the friction force between the cylindrical part 85*b* of the center hub 85 and the base part 91. More specifically, when the transmission torque is smaller than the torque by the friction force between the cylindrical part 85*b* of the center hub 85 and the base part 91, the center hub 85 and the base part 91 are rotated together. When the transmission torque is greater than the torque by the friction force between the cylindrical part 85*b* of the center hub 85 and the base part 91, the center hub 85 and the base part 91 slide against the friction force and rotate relative to each other. Note that a stopper 47*a* adapted to limit the clockwise rotation of the lever member 90 is integrally formed at the outer side surface of the bearing plate 47.

In other words, the lever member 90 pivots along with the shaft 22, by the function of the friction spring 94, in the direction in which the shaft 22 of the spindle 20 pivots. More specifically, when the spindle 20 rotates in the seatbelt drawing-out direction, the lever member 90 turns in a first direction (counterclockwise in FIG. 2) in which the engagement part 92 is engaged with the external teeth part 84 by the frictional work of the friction spring 94, and turns in a second direction (clockwise in FIG. 2) in which the engagement part 92 moves apart from the external teeth part 84 when the spindle 20 rotates in the seatbelt winding-up direction.

With reference to FIGS. 4(A) to 4(D) and 5(A) to 5(C), the function of the seatbelt retractor according to the embodiment will be described. In the following description, the seatback of a reclining type seat is tilted backward while a seated occupant wears the seatbelt.

As shown in FIG. 4(A), when the seatback of the reclining type seat, in other words, the seatbelt retractor 10 is for example in a reference position, i.e., 11° tilted backward with respect to the vertical direction, the lever member 90 has its engagement part 92 in a disengaged position apart from the external teeth part 84 (the external teeth 81 and 82 and the gap part 83). More specifically, the sensor housing 72 of the acceleration sensor 70 has its position maintained in the vertical direction by the gravity acting on the sensor weight 76.

Figure 4B:
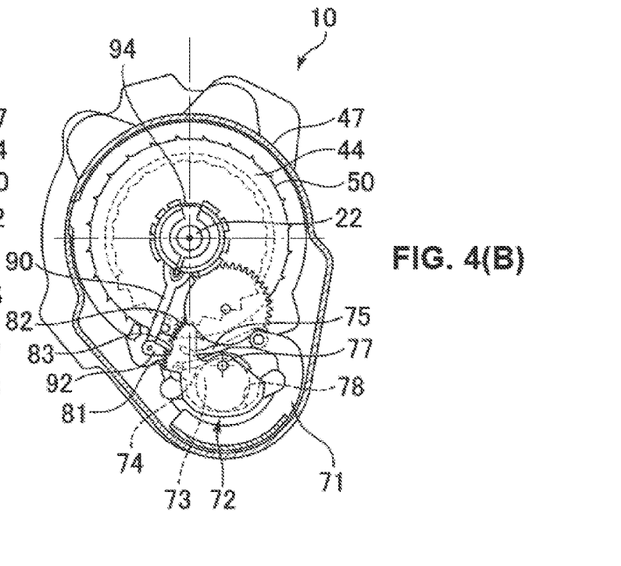
FIG. 4(B) is a side view of the seatbelt retractor when the seatback is tilted 12° backward.

Here, as shown in FIG. 4(B), as the seatback of the reclining type seat starts to be tilted backward (clockwise rotation in the figure) and the seatbelt retractor 10 is tilted for example 12° backward, the seatbelt is drawn out and the spindle 20 rotates counterclockwise, so that the lever member 90 coupled to the shaft 22 of the spindle 20 by friction coupling by the function of the friction spring 94 rotates counterclockwise.

In this way, the engagement part 92 of the lever member 90 turns in a first direction (counterclockwise in FIGS. 4(A) to 4(D)), the engagement part 92 of the lever member 90 abuts against the gap part 83 in the position on the side of the external teeth 81. At the time, the sensor housing 72 is not engaged by the engagement part 92 of the lever member 90 and has its position in the vertical direction maintained by the gravity acting on the sensor weight 76.

Figure 4C:
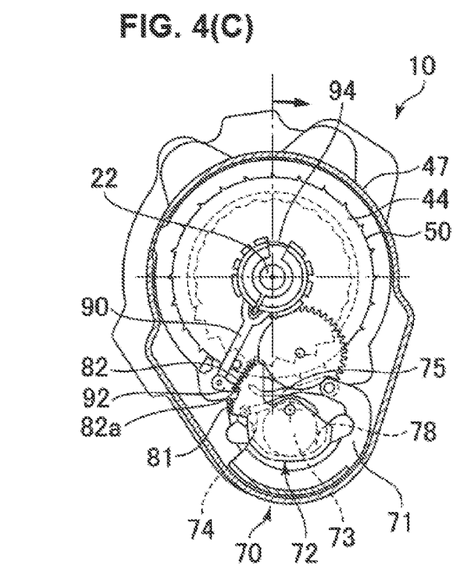
FIG. 4(C) is a side view of the seatbelt retractor when the seatback is tilted 17° backward.

Further as shown in FIG. 4(C), when the seatbelt retractor 10 is for example tilted 17° backward while the sensor housing 72 has its vertical position maintained, the engagement part 92 of the lever member 90 moves relatively toward the external teeth 82 in the gap part 83 by relative rotation between the sensor housing 72 and the seatbelt retractor 10 and abuts against the end face 82*a* of the gap part 83 on the side of the external teeth 82. At this point, the sensor housing 72 is not yet engaged by the lever member 90 and has its position in the vertical direction maintained.

Figure 4D:
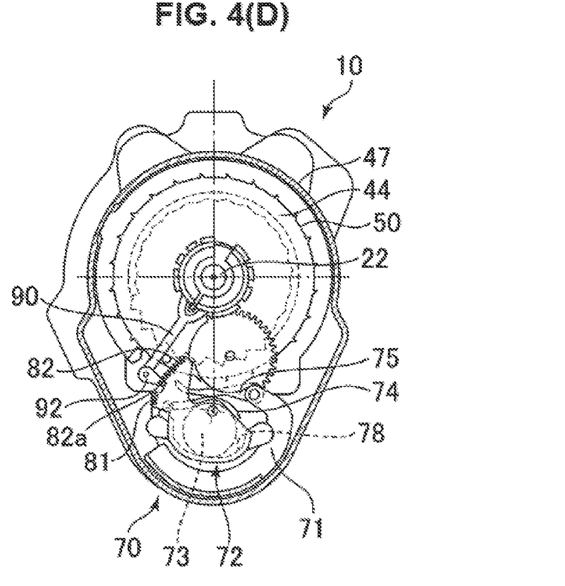
FIG. 4(D) is a side view of the seatbelt retractor when the seatback is tilted 25° backward.

Further as shown in FIG. 4(D), when for example the seatbelt retractor 10 is tilted 25° backward, the sensor housing 72 of the acceleration sensor 70 starts to rotate clockwise along with the rotation of the seatbelt retractor 10 (the backward tilt of the seatback) because the engagement part 92 of the lever member 90 is in abutment against the end face 82*a* of the gap part 83 on the side of the external teeth 82 at the external teeth part 84. FIG. 4(D) shows the state in which the acceleration sensor 70 is tilted 8° (25° to 17°) with respect to the vertical direction.

Figures 5A, 5B:
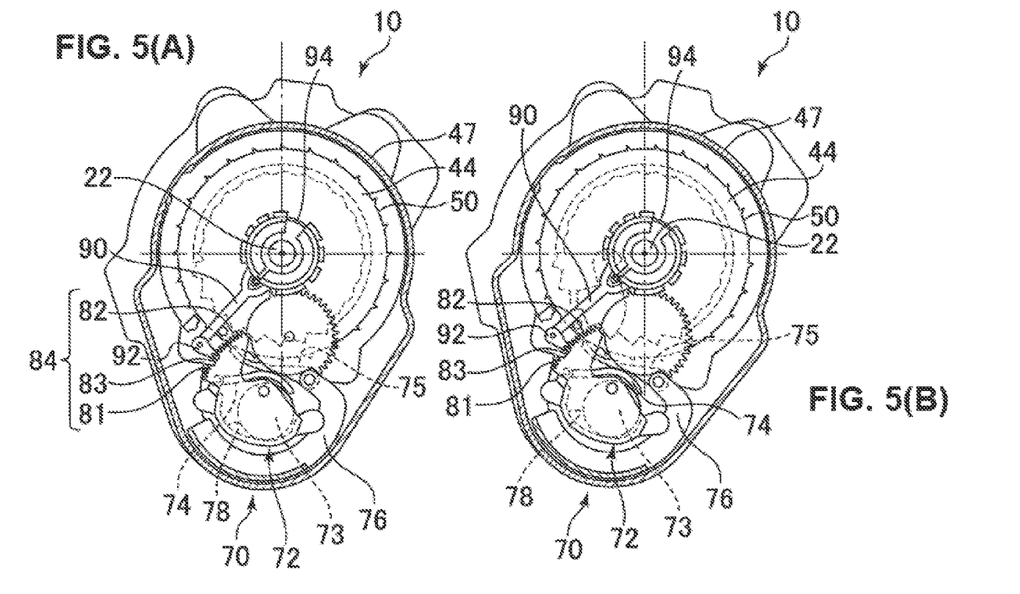
FIG. 5(A) is a side view of the seatbelt retractor when the seatback is tilted 33.2° backward.
FIG. 5(B) is a side view of the seatbelt retractor when the seatback is tilted 38° backward.

Further as shown in FIG. 5(A), when for example the seatbelt retractor 10 is tilted 33.2° backward, the sensor housing 72 rotates further clockwise, and the inertial body support surface 78 is tilted, so that the CS ball 73 supported by the inertial body support surface 78 moves rightward in the figure. Then, the first sensor lever 74 is raised by the CS ball 73 and pivots counterclockwise around the shaft 74*a*.

The first sensor lever 74 causes the second sensor lever 75 in abutment against the bowl part 74*b* to pivot clockwise around the support hole 75*a*, so that the engagement claw 75*b* is engaged with the engagement claw 50 of the steering wheel 44, and the steering wheel 44 stops rotating.

As shown in FIG. 5(B), when for example the seatbelt retractor 10 is tilted 38° backward, the lock dog 41 is engaged with the internal teeth 12 provided at the first side plate 11*a* on one side of the frame 11 to prevent the seatbelt from being drawn out.

Figure 5C:
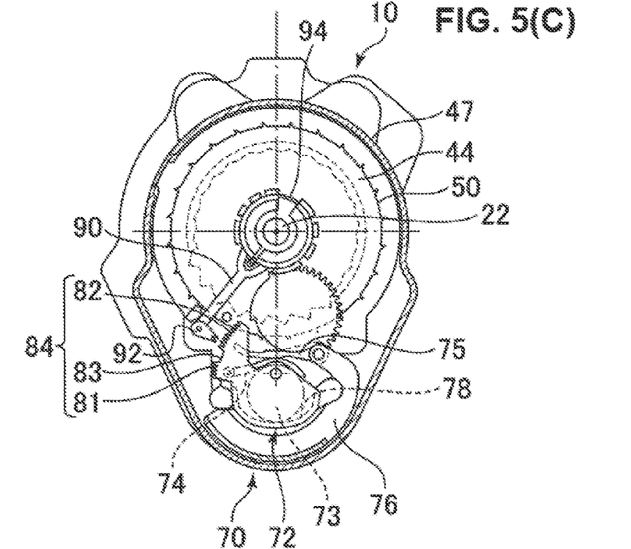
FIG. 5(C) is a side view of the seatbelt retractor when the seatback is tilted 25° backward and the seatbelt is wound up in the position.

As shown in FIG. 5(C), when for example the seatbelt retractor 10 is in a position tilted 25° backward, and the spindle 20 rotates in the seatbelt winding-up direction (clockwise), the lever member 90 coupled to the shaft 22 of the spindle 20 by friction coupling by the function of the friction spring 94 also rotates clockwise, so that the engagement part 92 of the lever member 90 and the external teeth part 84 of the sensor housing 72 are disengaged from each other. In this way, the sensor housing 72 rotates counterclockwise to the position in which the sensor housing 72 is arranged in the vertical direction by the gravity acting upon the sensor weight 76, and returns to the original state.

Note that the function of engagement/disengagement between the engagement part 92 of the lever member 90 and the external teeth part 84 of the sensor housing 72 by the clockwise rotation of the spindle 20 described above is achieved not only in the position tilted 25° backward, but also in any arbitrary backward-tilted position.

In this case, the engagement part 92 of the lever member 90 is in a disengaged position opposed to the external teeth 82 of the sensor housing 72, so that when the seatbelt is drawn out and the spindle 20 rotates counterclockwise, the engagement part 92 of the lever member 90 is immediately engaged with the external teeth 82 of the sensor housing 72.

When the seatbelt retractor 10 is further tilted backward, the CS ball 73 moves in the horizontal direction, so that the first and second sensor levers 74 and 75 pivot, which causes the engagement claw 75b to be engaged with the engagement claw 50 of the steering wheel 44. Then, the lock dog 41 is engaged with the internal teeth 12 provided at the first side plate 11a on one side of the frame 11, and the seatbelt is locked without locking delay and prevented from being drawn out.

As described above, in the seatbelt retractor 10 according to the embodiment, the external teeth part 84 is provided at the sensor housing 72 including the inertial body support surface 78. The engagement part 92 of the lever member 90 coupled to the shaft 22 of the spindle 20 by friction coupling turns when the spindle 20 rotates in the seatbelt drawing-out direction, and is engaged with the external teeth part 84. The gap part 83 having no teeth is formed at a part of the external teeth part 84. In this way, when the seatback of a reclining type seat is tilted backward, the timing in which the engagement part 92 of the lever member 90 and the external teeth part 84 of the sensor housing 72 are engaged with each other or the timing for starting locking the seatbelt is delayed, so that the amount of the seatbelt to be drawn out is increased, and the tightness of the seatbelt felt by the occupant can be eased when the occupant wearing the seatbelt reclines.

The external teeth part 84 is formed at the outer peripheral part formed as a part extending from a part of a side wall of the sensor housing, and therefore the sensor housing 72 having the external teeth part 84 can be produced inexpensively without increasing the number of parts.

The external teeth part 84 is formed by extending the side wall 72a of the sensor housing 72 in the vehicle-width direction into a flange shape, and therefore the sensor housing 72 having the external teeth part 84 engageable with the engagement part 92 of the lever member 90 can be produced inexpensively.

The gap part 83 of the external teeth part 84 is formed in a position corresponding to a prescribed reclining angle for the seatback, and therefore the locking starting timing for the seatbelt can be set arbitrarily by setting the position of the gap part 83 as appropriate. More specifically, the prescribed reclining angle is preferably an angle at which drawing-out locking is caused by drawing-out of the seatbelt during reclining of the seatback. Note that the present invention is not limited by the above-described embodiment and may be subjected, as appropriate, to modifications, improvement, or the like.

For example, the external teeth part may be formed at the sensor housing itself as a part of a side wall, while a plate-shaped member may be fixed on a side wall of the sensor housing, and the external teeth part may be formed at the outer peripheral part of the plate-shaped member. More specifically, the external teeth part is provided integrally with the sensor housing while the teeth part may be made of a discrete member and attached to the sensor housing or a part (a side wall) of the sensor housing may have the teeth part.

While the above description constitutes the preferred embodiment of the present invention, it will be appreciated that the invention is susceptible to modification, variation and change without departing from the proper scope and fair meaning of the accompanying claims.

The invention claimed is:

1. A seatbelt retractor adapted to be mounted to a seatback of a reclining type seat provided in a vehicle, the seatbelt retractor comprising:
   a spindle which winds up a seatbelt;
   an acceleration sensor which detects acceleration in a vehicle front-back direction; and
   a locking mechanism which locks a drawing-out of the seatbelt in response to an acceleration detected by the acceleration sensor, wherein
   the acceleration sensor comprises a sensor cover which tilts together with the seatback, a sensor housing having an inertial body-support surface and supported swingably with respect to the sensor cover around an axial line in a vehicle-width direction to swing in the vehicle front-back direction with respect to the sensor cover when the seatback is tilted, an inertial body supported on the inertial body-support surface and displaced from a neutral position when the acceleration reaches at least a prescribed value, and an actuating member which operates synchronously with movement of the inertial body in the vehicle front-back direction and actuates the locking mechanism to a locking side,
   the sensor housing comprises an external teeth part having a plurality of teeth arranged in a circular-arc shape,
   the retractor further comprising a lever member coupled to a shaft of the spindle by a friction coupling, wherein the lever member turns in a first direction in which an engagement part provided at a tip end of the lever is engaged with the external teeth part when the spindle rotates in a seatbelt drawing-out direction and turns in a second direction in which the engagement part moves apart from the external teeth part when the spindle rotates in a seatbelt winding-up direction,
   a gap part not having the teeth is formed at a part of the external teeth part.

2. The seatbelt retractor according to claim 1 further comprising, wherein the external teeth part is formed at an outer peripheral part formed as a part extending from a part of a side wall of the sensor housing.

3. The seatbelt retractor according to claim 2 further comprising, wherein the external teeth part is formed by extending a side wall of the sensor housing in the vehicle-width direction into a flange shape.

4. The seatbelt retractor according to claim 1 further comprising, wherein the external teeth part is formed at an outer peripheral part of a plate shaped member fixed on a side wall of the sensor housing.

5. The seatbelt retractor according to claim 1 further comprising, wherein the gap part of the external teeth part is formed in a position corresponding to a prescribed reclining angle for the seatback.

6. The seatbelt retractor according to claim 5 further comprising, wherein the prescribed reclining angle is an angle at which a drawing-out locking by the drawing out of the seatbelt occurs during reclining of the seatback.

7. The seatbelt retractor according to claim 1 further comprising, wherein when the lever engagement part engages with the external teeth part, a swinging motion of the sensor housing relative to the sensor cover is prevented.

8. The seatbelt retractor according to claim 1 further comprising, wherein when the lever engagement part engages with the gap part, a swinging motion of the sensor housing relative to the sensor cover is permitted and the sensor housing may maintain a vertical position by gravity.

9. The seatbelt retractor according to claim 8 further comprising, when the engagement part engages with the gap part a locking starting timing for the seatbelt provided by the retractor is delayed and the amount of the drawn out seatbelt is increased during the reclining as the sensor housing is permitted to undergo the swinging motion thereby preventing a locking of the locking mechanism.

\* \* \* \* \*